United States Patent
Monma et al.

(10) Patent No.: US 8,974,100 B2
(45) Date of Patent: Mar. 10, 2015

(54) LED LIGHTING UNIT FOR VEHICLE

(71) Applicant: Honda Motor Co., Ltd., Tokyo (JP)

(72) Inventors: Eikichi Monma, Wako (JP); Seiji Kido, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 13/920,476

(22) Filed: Jun. 18, 2013

(65) Prior Publication Data
US 2014/0009951 A1  Jan. 9, 2014

(30) Foreign Application Priority Data
Jul. 3, 2012  (JP) ................................. 2012-149803

(51) Int. Cl.
| | | |
|---|---|---|
| B60Q 1/04 | (2006.01) | |
| F21V 29/00 | (2006.01) | |
| F21S 8/10 | (2006.01) | |
| B62J 6/02 | (2006.01) | |

(52) U.S. Cl.
CPC ............. *F21V 29/20* (2013.01); *F21S 48/1109* (2013.01); *F21S 48/1159* (2013.01); *F21S 48/321* (2013.10); *F21S 48/328* (2013.01); *F21S 48/00* (2013.01); *B62J 6/02* (2013.01); *F21S 48/1104* (2013.01)
USPC ............ 362/516; 362/475; 362/547; 362/294

(58) Field of Classification Search
USPC .......... 362/475, 509, 543–545, 547, 294, 373
See application file for complete search history.

(56) References Cited

U.S. PATENT DOCUMENTS

| 7,568,817 B2 * | 8/2009 | Lee et al. ........................ 362/294 |
| 7,740,380 B2 * | 6/2010 | Thrailkill ....................... 362/294 |
| 2004/0223338 A1 | 11/2004 | Koike et al. |
| 2009/0040759 A1 * | 2/2009 | Zhang et al. ................... 362/249 |

FOREIGN PATENT DOCUMENTS

| JP | 2004-342574 A | 12/2004 |
| JP | 2008-192313 A | 8/2008 |

* cited by examiner

*Primary Examiner* — Thomas M Sember
(74) *Attorney, Agent, or Firm* — Birch, Stewart, Kolasch & Birch, LLP

(57) ABSTRACT

A lighting unit for a motorcycle for efficiently cooling heat generated from an LED apparatus. An LED lighting unit includes two plate-like members on which LED apparatus are mounted as light sources. Reflectors are disposed so as to cover the LED apparatus and configured to reflect irradiation light from the LED apparatus forwardly of the vehicle body. The two plate-like members are disposed in an opposing relationship to each other with a space provided therebetween such that mounting faces of the LED apparatus are directed to the outer sides. Cooling fins are provided on the two plate-like members in such a manner so as to extend in an opposing relationship to each other toward the space. The cooling fins are disposed such that a longitudinal direction thereof is perpendicular to a longitudinal direction of the two plate-like members. The plate-like members and the reflectors are formed separately from each other.

20 Claims, 7 Drawing Sheets

LED LIGHTING UNIT FOR VEHICLE

CROSS-REFERENCE TO RELATED APPLICATIONS

The present application claims priority under 35 USC 119 to Japanese Patent Application No. 2012-149803 filed Jul. 3, 2012 the entire contents of which are hereby incorporated by reference.

BACKGROUND OF THE INVENTION

1. Field of the Invention

The present invention relates to an LED lighting unit for a vehicle. More particularly to an LED lighting unit for a vehicle wherein a light emitting diode as a light source and a board for the lighting unit can be cooled efficiently.

2. Description of Background Art

A lighting unit for a motorcycle wherein a light emitting diode (LED) is used as a light source is conventionally known. The LED is small in size in comparison with an incandescent bulb to enable miniaturization of a lighting unit. However, since the LED is an electronic part mounted on the surface of an electronic board and the degree of importance of thermal management rises together with an increase in the amount of light from the LED, a different scheme from that for an incandescent bulb may be required for the arrangement structure of the LED.

Japanese Patent Laid-Open No. 2008-192313 discloses an LED lighting unit that has two kinds of reflectors for a low beam and a high beam and wherein changeover between a low beam and a high beam is carried out by changing the irradiation direction of the LED using an actuator. In this lighting unit, a heat sink as a cooling mechanism is provided at a side portion of an LED board which is pivotally moved by the actuator.

Japanese Patent Laid-Open No. 2004-342574 discloses another LED lighting unit for a vehicle wherein a board on which an LED for a low beam is mounted and a board on which another LED for a high beam is mounted are disposed in a spaced relationship from each other such that LED mounting faces for the LEDs are directed in upward and downward directions.

According to the LED lighting unit disclosed in Japanese Patent Laid-Open No. 2004-342574, a low beam and a high beam can be provided by a simple structure without using such an actuator as in Japanese Patent Laid-Open No. 2008-192313. However, such a cooling mechanism as the heat sink disclosed in Japanese Patent Laid-Open No. 2008-192313 is not provided. Thus, there is room for improvement in thermal management.

On the other hand, where the shape and the disposition of the heat sink disclosed in Japanese Patent Laid-Open No. 2008-192313 are applied, it is difficult to assure a great capacity. Further, since the heat sink can be visually recognized from outside the lighting unit, the appearance of the lighting unit is deteriorated.

SUMMARY AND OBJECTS OF THE INVENTION

The object of an embodiment of the present invention resides in providing a lighting unit for a motorcycle that solves the situations described above to enable the efficient cooling of heat generated from an LED apparatus while an LED for a low beam and another LED for a high beam are provided separately and independently of each other.

According to an embodiment of the present invention, an LED lighting unit (2) for a vehicle includes two plate-like members (31, 41) on which LED apparatus (60, 70) are mounted as light sources and reflectors (34, 44) disposed so as to cover the LED apparatus (60, 70) and configured to reflect irradiation light from the LED apparatus (60, 70) forwardly of the vehicle body. The two plate-like members (31, 41) are disposed in an opposing relationship to each other with a space (50) provided therebetween such that mounting faces (31b, 41b) of the LED apparatus (60, 70) are directed to the outer sides. The cooling fins (35, 45) are provided on the two plate-like members (31, 41) in such a manner so as to extend in an opposing relationship to each other toward the space (50).

The LED lighting unit for a vehicle provides cooling fins (35, 45) that are disposed such that a longitudinal direction thereof is perpendicular to a longitudinal direction of the two plate-like members (31, 41).

According to an embodiment of the present invention, the LED lighting unit for a vehicle includes plate-like members (31, 41) and the reflectors (34, 44) that are formed separately from each other.

According to an embodiment of the present invention, the LED lighting unit for a vehicle has one of the two plate-like members (31, 41) that configures a high beam while the other of the two plate-like members (31, 41) configures a low beam.

According to an embodiment of the present invention, the LED lighting unit for a vehicle includes erected portions (31a, 41a) having a face substantially perpendicular to the mounting faces (31b, 41b) of the LED apparatus (60, 70) that are formed at one end portion of the plate-like members (31, 41) on the rear face side of the reflectors (34, 44), and second cooling fins (38, 39) are provided on the erected portions (31a, 41a).

According to an embodiment of the present invention, the LED lighting unit for a vehicle includes second cooling fins (38, 39) that are formed on the opposite faces of the erected portions (31a, 41a), and on the rear face side of the reflectors (34, 44). The second cooling fins (38, 39) are formed so as to extend to a position in the proximity of the reflectors (34, 44) along a shape of the reflectors (34, 44).

According to an embodiment of the present invention, the LED lighting unit for a vehicle includes two plate-like members (31, 41) that are spaced from and fixed to each other with a spacer (52) interposed therebetween. The cooling fins (35, 45) are disposed so as not to contact with any other member in the heightwise direction thereof.

According to an embodiment of the present invention, the LED lighting unit for a vehicle includes two plate-like members (31, 41) with shapes that are the same as each other.

According to an embodiment of the present invention, the LED lighting unit for a vehicle includes cooling fins (35, 45) that are formed so as to overlap with each other in the heightwise direction without contacting with each other when the two plate-like members (31, 41) are fixed.

According to an embodiment of the present invention, the cooling fins are provided on the two plate-like members in such a manner so as to extend in an opposing relationship to each other toward the space. Therefore, heat generated from the LEDs as light sources can be dissipated from the rear side to the mounting faces. Further, since the heat dissipation portion can be assured by the size of the plate-like members, a great heat dissipation area can be assured. Furthermore, since the cooling fins which configure a heat sink are disposed at a position at which they are less liable to be visually recognized from the outside, the appearance of the LED lighting unit is not degraded.

According to an embodiment of the present invention, the cooling fins are disposed such that the longitudinal direction thereof is perpendicular to the longitudinal direction of the two plate-like members. Therefore, a large number of cooling fins can be formed. Thus, heat from the plate-like members can be dissipated effectively.

According to an embodiment of the present invention, the plate-like members and the reflectors are formed separately from each other. Therefore, the shape of the plate-like members is less liable to be influenced by the shape of the reflectors, and the degree of freedom in shape of the plate-like members is enhanced. In addition, a large disposition space can be assured for the cooling fins. Further, various LED lighting units can be configured by changing only the reflectors.

According to an embodiment of the present invention, one of the two plate-like members configures a high beam while the other of the two plate-like members configures a low beam. Therefore, the cooling fins can be formed without complicating the shape of the plate-like members, and the space between the plate-like members for high and low beams can be utilized effectively as a disposition space for the cooling fins.

According to an embodiment of the present invention, the erected portions include a face substantially perpendicular to the mounting faces of the LED apparatus that are formed at one end portion of the plate-like members on the rear face side of the reflectors. The second cooling fins are provided on the erected portions. Therefore, by the provision of the erected portions, the disposition space for the cooling fins can be expanded to enhance the cooling performance.

According to an embodiment of the present invention, the second cooling fins are formed on the opposite faces of the erected portions, and on the rear face side of the reflectors. The second cooling fins are formed so as to extend to a position in proximity to the reflectors along the shape of the reflectors. Therefore, the cooling fins can be formed in a maximally increased size.

According to an embodiment of the present invention, the two plate-like members are spaced from and fixed to each other with the spacer interposed therebetween, and the cooling fins are disposed so as not to contact with any other member in the heightwise direction thereof. Therefore, the assembling property is improved, and also the cooling performance for the LEDs and so forth can be improved.

According to an embodiment of the present invention, the two plate-like members have shapes the same as each other. Therefore, by fabricating a common mold, the productivity can be improved.

According to an embodiment of the present invention, the cooling fins are formed so as to overlap with each other in the heightwise direction without contacting with each other when the two plate-like members are fixed. Therefore, the heightwise dimension of the cooling fins can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
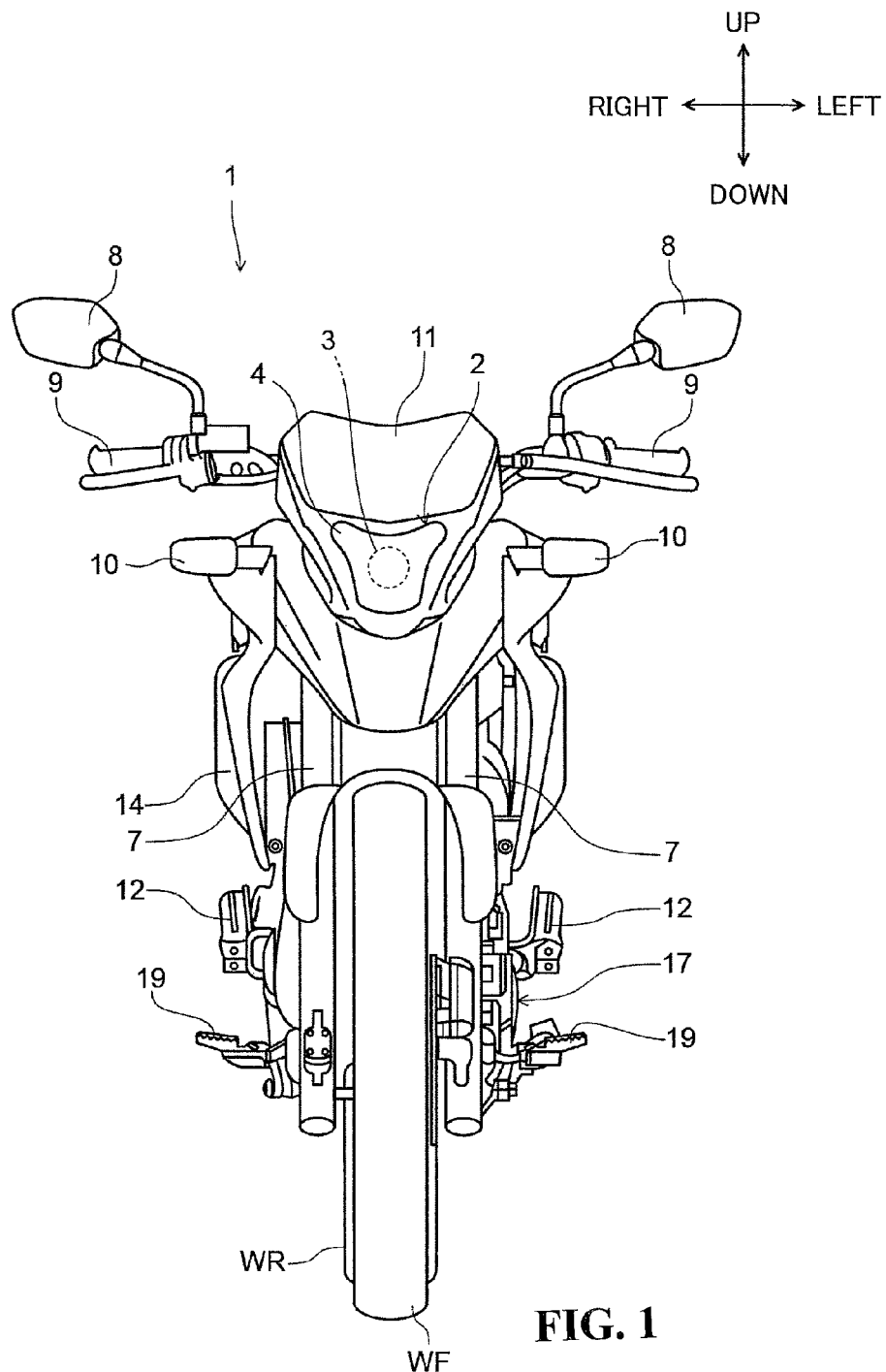
FIG. 1 is a front elevational view of a motorcycle wherein an LED lighting unit according to an embodiment is applied.

In the following, a preferred embodiment of the present invention is described in detail with reference to the drawings. FIG. 1 is a front elevational view of a motorcycle 1 to which an LED lighting unit 2 according to an embodiment of the present invention is applied. A front wheel WF of the motorcycle 1 is supported on a vehicle body frame (not shown) by a pair of front forks 7 in a vehicle widthwise direction. A steering handlebar 9 for steering the front wheel WF is attached to an upper portion of the front forks 7 with a pair of left and right back mirrors 8 fixed to the steering handlebar 9. An engine 17 is disposed substantially at the center in a forward and rearward direction of the vehicle body between the front wheel WF and a rear wheel WR. Further, a pair of left and right foot placing steps 19 are attached to a lower portion of the engine 17. In addition, foot placing steps 12 for a passenger are attached to the rear side of the vehicle body with respect to the engine 17.

The front forks 7 are covered at an upper portion thereof with cowlings 14 as a pair of exterior parts in the vehicle widthwise direction. Blinker devices 10 are attached on the cowlings 14. A front cowl 11 is attached to the front side of the vehicle body with respect to the steering handlebar 9 above the cowlings 14. The LED lighting unit 2 for a vehicle (hereinafter referred to sometimes merely as LED lighting unit) according to the present invention is attached to the front cowl 11 from the back face side of the front cowl 11. The LED lighting unit 2 is a headlamp that uses a light emitting diode as a light source. A through-hole 3 is provided in an extension (refer to FIG. 3) disposed on the inner side of an outer lens 4 such that a reflector for reflecting irradiation light forwardly of the vehicle is exposed therethrough.

Figure 2:
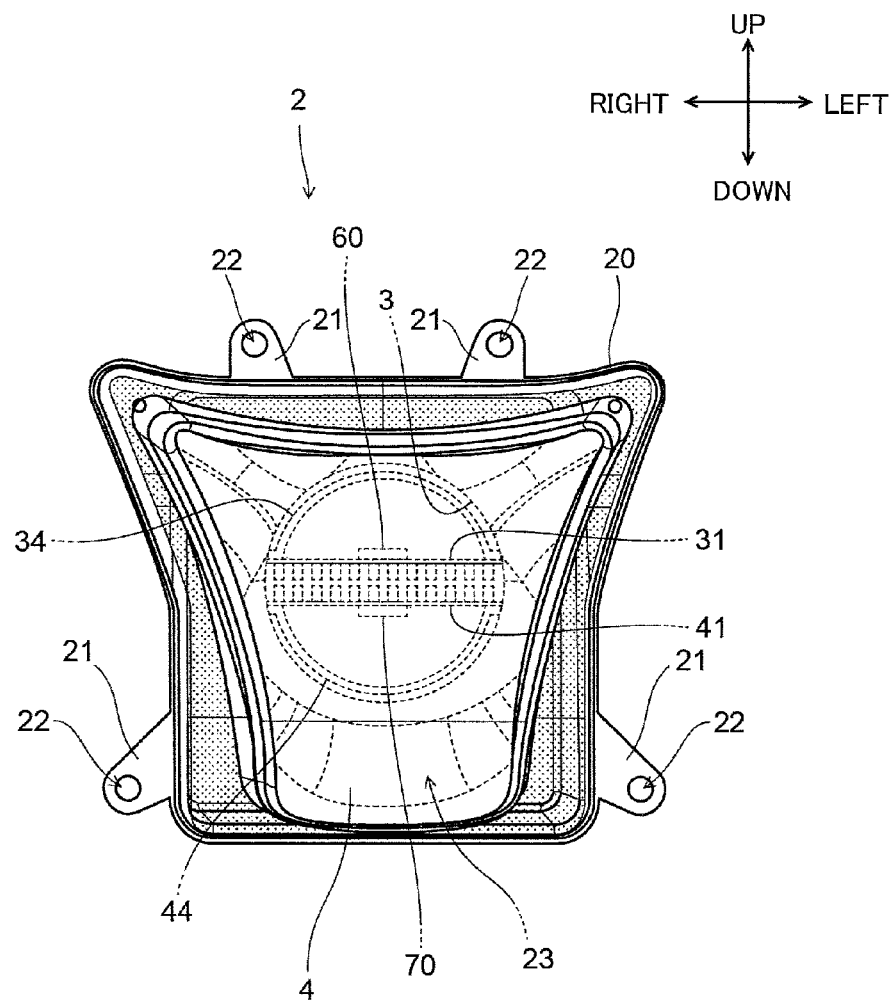
FIG. 2 is a front elevational view of the LED lighting unit for a vehicle.
Figure 3:
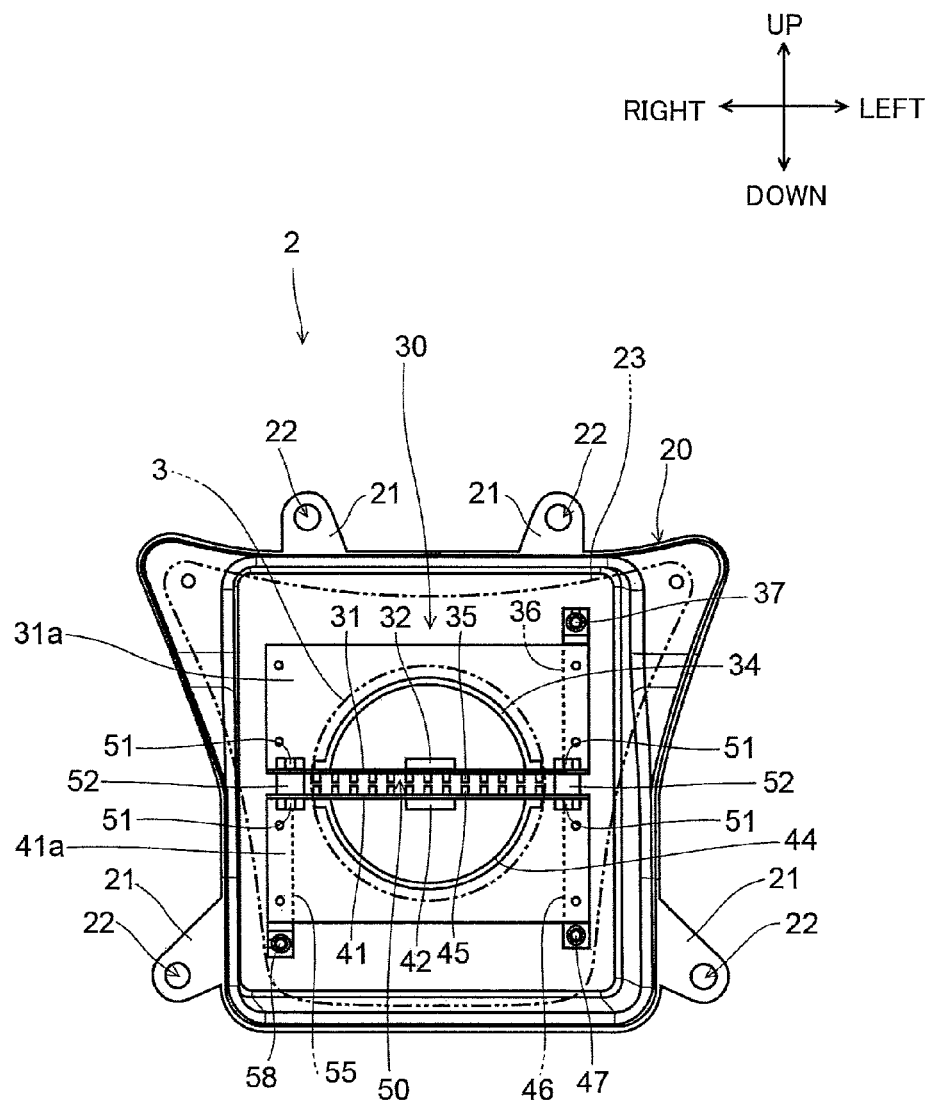
FIG. 3 is a front elevational view of the LED lighting unit in a state in which an outer lens and an extension are removed.

FIG. 2 is a front elevational view of the LED lighting unit 2. Meanwhile, FIG. 3 is a front elevational view of the LED lighting unit 2 in a state in which the outer lens 4 and the extension 23 are removed. The LED lighting unit 2 is configured by attaching an LED unit 30 to a base member 20 that is an attachment portion to the vehicle body side, attaching the extension 23 so as to cover the LED unit 30 and further attaching the outer lens 4. The outer lens 4 has a shape conforming to the outline shape of the base member 20. The extension 23 and the outer lens 4 are fixed to the base member 20.

Four attachment stays 21 for attaching the LED lighting unit 2 to the front cowl 11 are provided on a peripheral edge of the base member 20 that is formed from a resin of a black color or the like. The LED lighting unit 2 is configured such that, when it is attached to the rear face side of the front cowl 11 using threaded holes 22 formed in the attachment stays 21, only a lens face of the LED lighting unit 2 on the inner side of a portion indicated by broken line in the drawings is exposed forwardly of the vehicle body through the opening of the front cowl 11.

The LED unit 30 includes LED apparatus 60 and 70 formed from LEDs 32a and 42a and boards 32 and 42 which support the LEDs 32a and 42a, respectively. The LED unit 30 is supported for a rocking motion around a lower portion of the left side thereof in the vehicle widthwise direction with respect to the base member 20 with a support shaft 47 as a center. The LED unit 30 is configured further such that optical axis adjustment thereof in the vertical direction can be carried out by an adjustment mechanism 37 provided at an upper portion of the left side of the LED unit 30 in the vehicle widthwise direction. The LED unit 30 is configured further such that optical axis adjustment thereof in the horizontal direction can be carried out by another adjustment mechanism 58 provided at a lower portion of the right side of the LED unit 30 in the vehicle widthwise direction.

The extension 23 is formed from a colored transparent resin, for example of a smoke color and has a function that it exposes forwardly only reflectors 34 and 44, which reflect irradiation light of the light source forwardly of the vehicle body, through the through-hole 3 and masks outside portions with respect to the reflectors 34 and 44 so that they are not visually recognized from the outside.

Figure 4:
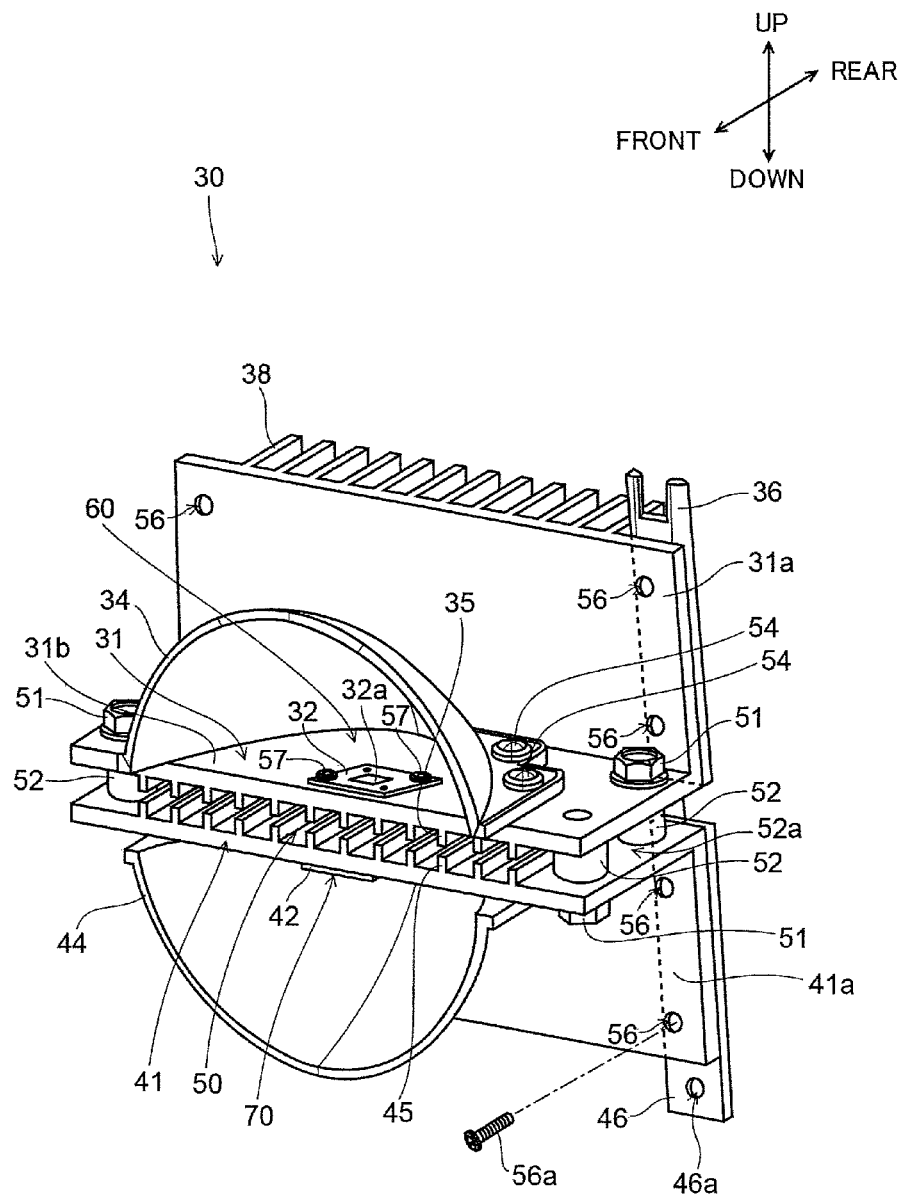
FIG. 4 is a perspective view of an LED unit.

FIG. 4 is a perspective view of the LED unit 30. The LED unit 30 is configured by coupling a low beam plate-like member 31 (vehicle body upper side) on which the low beam LED apparatus 60 is mounted and a high beam plate-like member 41 (vehicle body lower side) on which the high beam LED apparatus 70 is mounted. The low beam LED apparatus 60 and the high beam LED apparatus 70 are attached to the low beam plate-like member 31 and the high beam plate-like member 41, respectively, individually by two screws 57. In the present embodiment, the low beam plate-like member 31 and the high beam plate-like member 41 have substantially the same structure. Therefore, in the following description, portions of the plate-like members that have the same structure are described in regard to the low beam plate-like member 31 as a representative.

In the low beam plate-like member 31 (high beam plate-like member 41), a mounting face 31b of the low beam LED apparatus 60 (high beam LED apparatus 70) lies in a substantially horizontal direction. The low beam reflector 34 (high beam reflector 44) is fixed to the mounting face 31b using mounting screws 54. The low beam reflector 34 (high beam reflector 44) is curved in such a manner so as to cover the low beam LED apparatus 60 from above (cover the high beam LED apparatus 70 from below). Since the reflectors 34 and 44 are configured as separate parts from the plate-like members 31 and 41, it is possible to form the plate-like members 31 and 41 from a metal that is superior in heat dissipation. The reflectors 34 and 44 can be formed from a synthetic resin or the like to which metal deposition or plating is applied. Consequently, a lighting unit that is low in cost and weight and superior in heat dissipation can be formed.

It is to be noted that the LED unit 30 in the present embodiment is configured such that, upon selection of a low beam, only the low beam LED 32a is turned on. However, upon selection of a high beam, only the high beam LED 42a is turned on. However, the LED unit 30 may otherwise be configured such that, for example, upon selection of a high beam, both of the LEDs 32a and 42a are turned on simultaneously. In another embodiment, the light amounts of the LED apparatus 60 and 70 may be made different from each other, or the reflectors 34 and 44 may have different shapes from each other.

The LED lighting unit 2 according to the present embodiment is characterized in that both of a high cooling performance for both of the LED apparatus 60 and 70 and reduction in size of the LED unit 30 are achieved by fixing the low beam plate-like member 31 and the high beam plate-like member 41 in a state in which a predetermined space 50 is assured between them.

The low beam plate-like member 31 and the high beam plate-like member 41 are fixed at the opposite end portions in the longitudinal direction thereof by bolts 51 with spacers 52, the opposite ends of which are a cylindrical shape, interposed therebetween. Thus, the space 50 for cooling is assured by the spacers 52. A plurality of cooling fins 35 provided on a lower face of the low beam plate-like member 31 and a plurality of cooling fins 45 provided on an upper face of the high beam plate-like member 41 extend in an opposing relationship to each other into the space 50. In other words, the cooling fines 35 and 45 are disposed such that the longitudinal direction thereof is directed perpendicularly to the longitudinal direction of the plate-like members 31 and 41. With the configuration just described, the space between the upper and lower plate-like members 31 and 41 can be effectively utilized to enhance the cooling performance for the LED apparatus 60 and 70 and the plate-like members 31 and 41.

According to the configuration described above, the plate-like members 31 and 41 are fixed in a spaced relationship from each other with the spacers 52 interposed therebetween such that the cooling fines 35 and 45 are disposed not to contact with any other member in the heightwise direction. Therefore, the assembling property is improved, and also the cooling performance for the LEDs is improved. It is to be noted that the plate-like members 31 and 41 can be formed from a resin, a metal or the like. In addition, the cooling fines 35 and 45 can be formed from a metal such as aluminum and fixed to the plate-like members 31 and 41 by a bonding agent, a fastening member or the like.

Air that passes the space 50 flows in the vehicle body forward and rearward directions along the formation direction of the cooling fines 35 and 45. Air also flows in the vehicle widthwise directions through gaps 52a formed at end portions of the cooling fines 35 and 45 in the longitudinal directions.

Further, an erected portion 31a is provided at an end portion of the low beam plate-like member 31 on the vehicle body rear side such that it is directed upwardly in the vertical direction. In addition, an erected portion 41a is provided at an end portion of the high beam plate-like member 41 on the vehicle body rear side such that it is directed downwardly in the vertical direction. The erected portions 31a and 41a configure another plane substantially perpendicular to the mounting faces 31b and 41b of the LED apparatus 60 and 70, respectively. Further, in the present embodiment, the plate-like members 31 and 41 and the erected portions 31a and 41a are individually formed integrally with each other such that the plate-like members generally have a substantially L-shaped cross sectional shape.

To the erected portion 31a on the upper side of the vehicle body, an attachment stay 36 in the form of a plate is fixed. The adjustment mechanism 37 is attached to a left end portion in the vehicle widthwise direction of the attachment stay 36. Meanwhile, to the erected portion 41a on the lower side of the vehicle body, an attachment stay 46 and another attachment stay 55 are fixed. The support shaft (aiming pivot) 47 is fixed to a left end portion in the vehicle widthwise direction of the attachment stay 46, and an adjustment mechanism 58 is attached to a right end portion in the vehicle widthwise direction of the attachment stay 46. The attachment stays 46 and 55 are fixed by fixing screws 56a fitted in through-holes 56 formed therein. Cutouts are provided on the attachment stays 36 and 55 such that they are engaged by the adjustment mechanisms 37 and 58, respectively, and a through-hole 46a is provided in the attachment stay 46 such that it is engaged by the support shaft 47. It is to be noted that also it is possible to fix the attachment stays using the through-holes 56 on the right side in the vehicle widthwise direction of the erected portion 31a in response to the structure of the base member 20.

On a face of the erected portions 31a and 41a on the vehicle body rear side to which the attachment stays 36, 46 and 55 are fixed, a plurality of second cooling fins 38 are provided. By the second cooling fins 38, the heat capacity of the cooling fins is increased further. The present invention can even sufficiently cope with a case wherein the generated heat amount by the LED apparatus 60 and 70 becomes greater. In the present embodiment, a heat sink is implemented by the plate-like members 31 and 41, cooling fins 35 and 45 and erected portions 31a and 41a.

Figure 5:
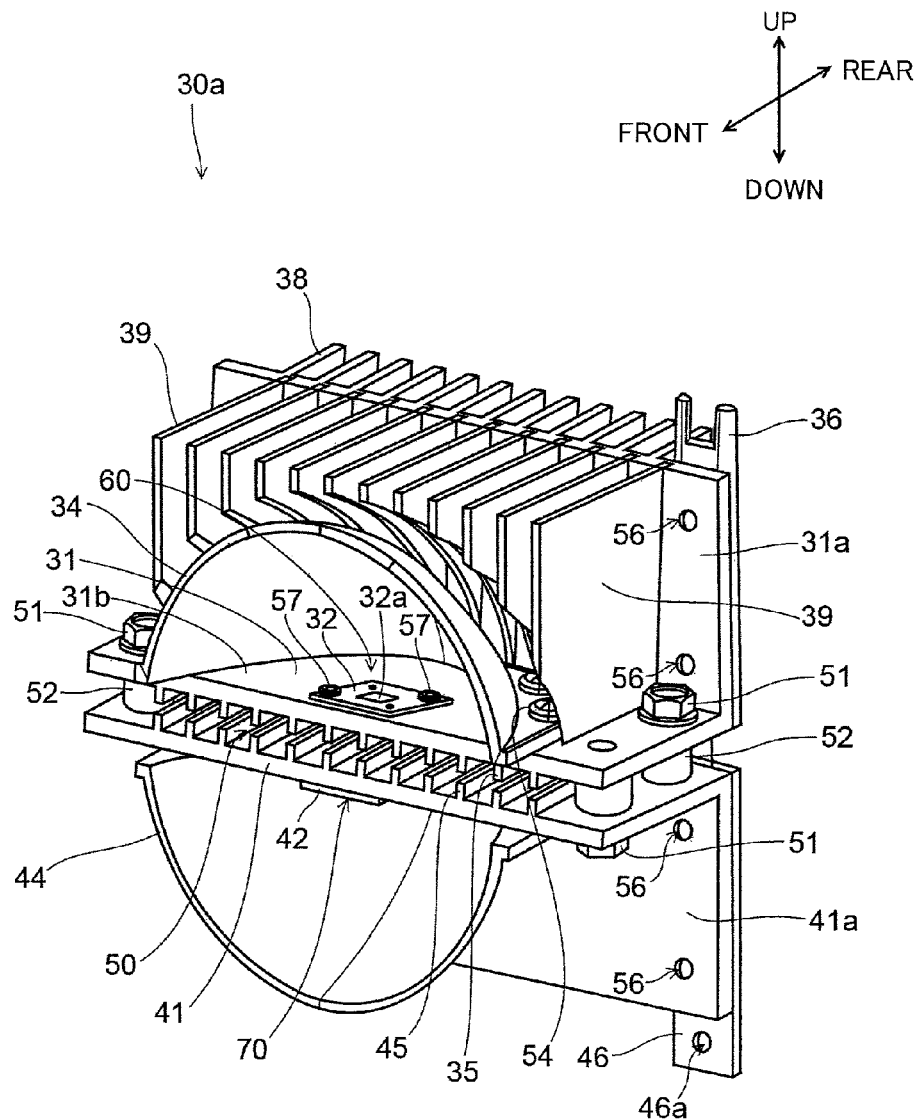
FIG. 5 is a perspective view of an LED lighting unit for a vehicle according to a modification to the embodiment.

FIG. 5 is a perspective view of an LED unit 30a applied to a lighting unit according to a modification to the present embodiment. Like symbols to those used in the foregoing description denote like or equivalent portions. The present modification is characterized in that not only the second cooling fins 38 are provided on a face on the vehicle body rear side of the erected portion 31a of the low beam plate-like member 31 but also a plurality of second cooling fins 39 are provided on a face on the vehicle body front side of the erected portion 31a. The cooling fins 39 extend to the vehicle body front side to a position close to the reflector 34 along a shape of a rear face of the reflector 34, and the cooling effect is enhanced further. Since a space is provided between the cooling fins 39 and the reflector 34, heat of the cooling fins 39 is less liable to be transmitted to the reflector 34. It is to be noted that also the bolts 54 for fixing the reflector 34 to the plate-like member 31 have a heat dissipation function because they face this space.

Figure 6:
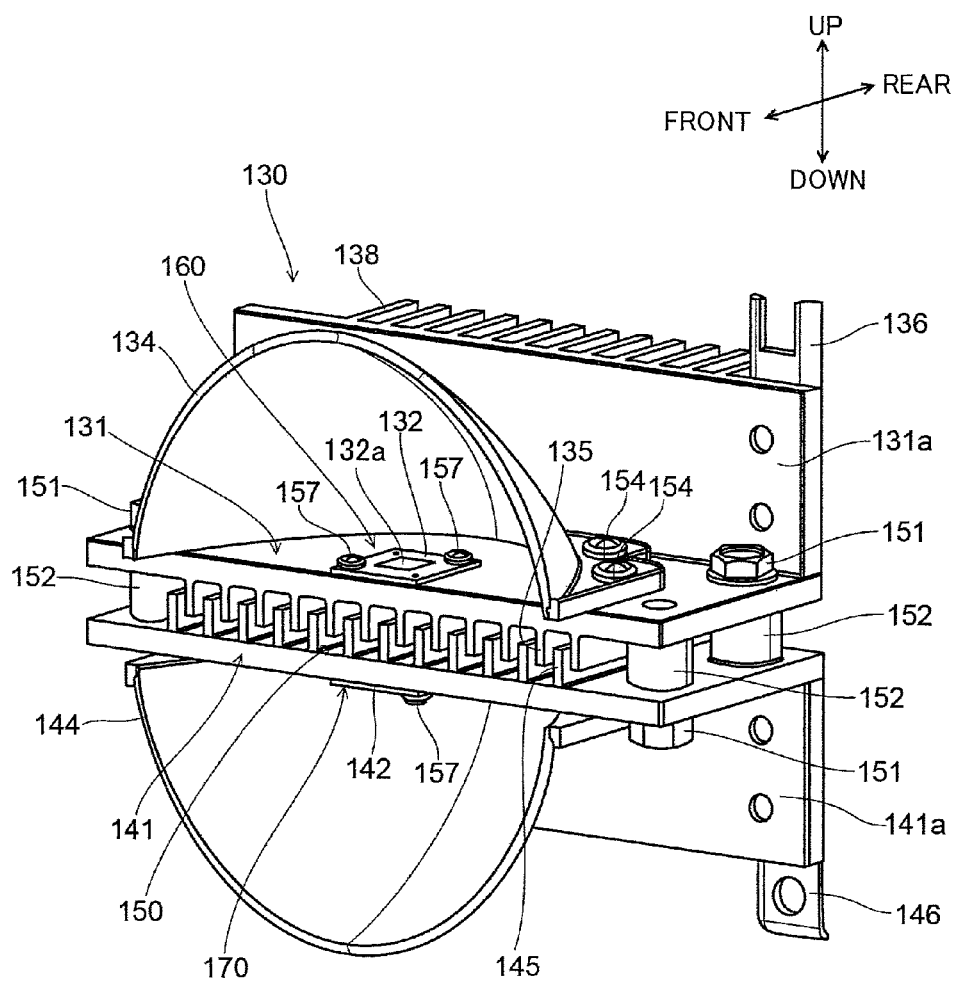
FIG. 6 is a perspective view of an LED unit according to a second modification to the embodiment.

FIG. 6 is a perspective view of an LED unit 130 for a vehicle according to a second modification to the present embodiment. The LED unit 130 is characterized in that the cooling fins are provided uprightly on the plate-like members and overlap with each other in the upward and downward direction. According to this configuration, while a large number of cooling fins are provided on plate-like members, it is possible to increase the dimension of the cooling fins in the heightwise direction or reduce the dimension of the LED unit 130 in the heightwise direction. The basic structure of the LED unit 130 is similar to that of the LED unit 30 described hereinabove in connection with the embodiment. However, the LED unit 130 in the present modification is different in that, since cooling fins 135 and 145 are formed in an offset relationship from each other with respect to the through-holes for bolts 151, when a low beam plate-like member 131 and a high beam plate-like member 141 are opposed to each other, the cooling fins thereof overlap with each other in the heightwise direction without contacting with each other.

The low beam plate-like member 131 and the high beam plate-like member 141 that have the same shape are fixed by the bolts 151 with four spacers 152 interposed therebetween such that they have a gap 150 therebetween. LED apparatus 160 and 170 are mounted on the low beam plate-like member 131 and the high beam plate-like member 141, respectively. The plurality of cooling fins 135 and 145 are formed on the plate-like members 131 and 141, respectively.

In the following, a description is given taking the low beam plate-like member 131 as a representative. To the low beam plate-like member 131, the LED apparatus 160 for a low beam is fixed by screws 157 and a curved reflector 134 is fixed by screws 154. The LED apparatus 160 is configured from a board 132 and an LED 132a, and attachment stays 136 and 146 are fixed to left end portions in the vehicle widthwise direction of the erected portions 131a and 141a, respectively. The plate-like members 131 and 141 are fixed to each other by bolts 151 with spacers 152 interposed therebetween. Further, the plurality of cooling fins 135 provided on a lower face of the low beam plate-like member 131 and the plurality of cooling fins 145 provided on an upper face of the high beam plate-like member 141 extend into the gap 150 for cooling assured by the spacers 152 such that the cooling fins 135 and the cooling fins 145 are disposed alternately in the horizontal direction and overlap with each other in the heightwise direction. Consequently, the heightwise dimension of the cooling fins 135 and 145 can be increased.

Figure 7:
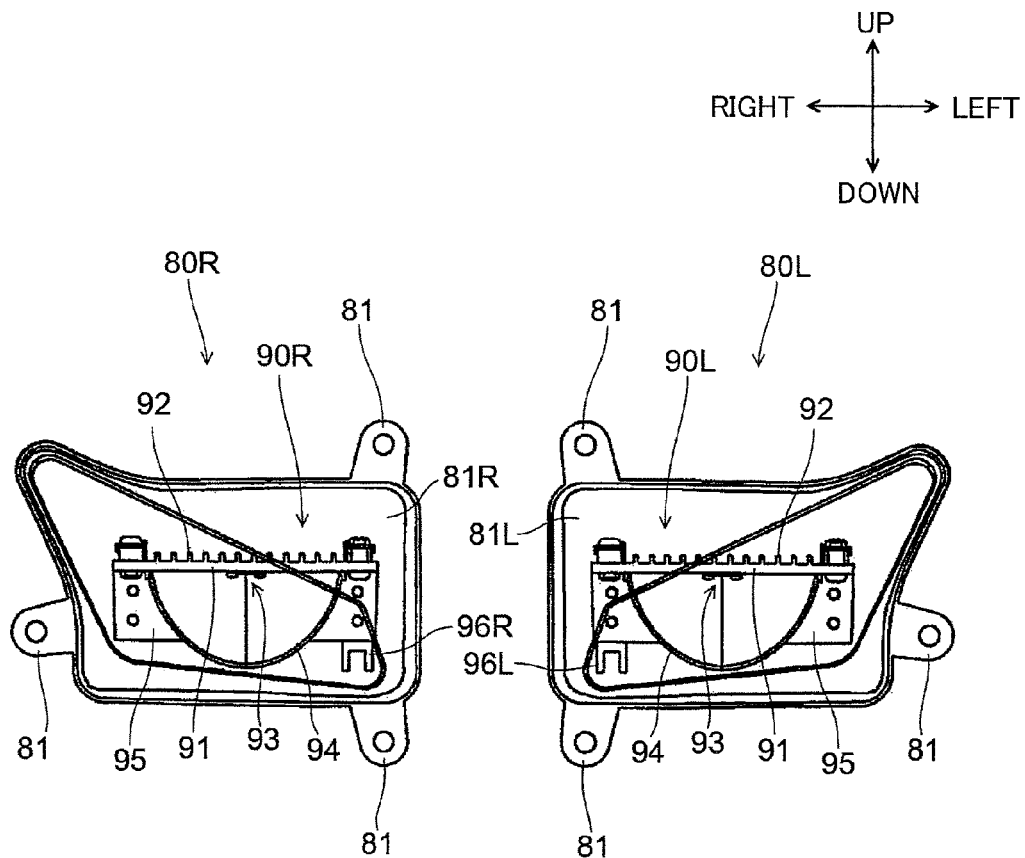
FIG. 7 is a front elevational view showing an example wherein LED units of the same structure are used in a headlamp of the type of two left and right lamps.

FIG. 7 is a front elevational view showing an example wherein LED units 90L and 90R of the same structure are used in head lamps 80L and 80R of the type of two left and right lamps. The LED units according to the present embodiment are configured such that plate-like members for a high beam and a low beam are formed in the same shape so that a common mold for casting or injection molding is used for them to improve the productivity. By utilizing this, the head lamps 80L and 80R of the type of two left and right lamps can be configured from a common plate-like member 91.

The left side lighting unit 80L is configured by attaching the left side LED unit 90L to a left side housing 81L having attachment flanges 81 to the vehicle body. Similarly, the right side lighting unit 80R is configured by attaching the right side LED unit 90R to a right side housing 81R having attachment flanges 81 to the vehicle body. In this instance, the left and right LED units 90L and 90R can cope with any of the left and right housings 81L and 81R by forming the plate-like member 91 on which cooling fins 92 are formed, an LED apparatus 93, a reflector 94 and an erected portion 95 commonly and exchangeably using attachment stays 96L and 96R fixed to the erected portion 95 between the LED units 90L and 90R. Also it is possible for the headlamps of the type of two left and right lamps to cope with a structure wherein only the LED apparatus 93 and the reflector 94 are made different between the headlamps such that different roles for a high beam and a low beam are allocated to the left and right lamps.

As described above, according to the LED lighting unit for a vehicle according to the present invention, the LED lighting unit for a vehicle that includes two plate-like members on which LED apparatus are mounted as light sources with reflectors disposed so as to cover the LED apparatus and configured to reflect irradiation light from the LED apparatus forwardly of the vehicle body. The two plate-like members are disposed in an opposing relationship to each other with a space provided therebetween such that mounting faces of the LED apparatus are directed to the outer sides. Cooling fins are provided on the two plate-like members in such a manner so as to extend in an opposing relationship to each other toward the space. Therefore, it is possible to effectively utilize the space between the two plate-like members to dissipate heat generated by the LEDs from the rear side to the mounting faces.

It is to be noted that the shape and the structure of the housing and the lens of the LED lighting unit, the shape and the structure of the LED apparatus and the plate-like members, the shape and the number of the cooling fins, the shape and the color density of the extension, the shape and the structure of the reflectors, the structure of the optical axis adjustment mechanisms and so forth are not limited to those of the embodiments. However, various alterations are possible. For example, the two plate-like members may be disposed such that the upper side one is used for a high beam while the lower side one is used for a low beam. In the alternative, a plate-like member and a reflector may be formed integrally, or a plate-like member and an erected portion may be configured as separate members, which are fixed to each other by a fastening member. The LED lighting unit for a vehicle according to the present invention can be applied not only to a motorcycle but also to various vehicles of the saddle type such as three- and four-wheeled vehicles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An LED lighting unit for a vehicle including two plate-like members, each member having an LED apparatus mounted as a light source and a reflector disposed for covering the LED apparatus configured to reflect light from the LED apparatus forwardly of the vehicle and wherein the two plate-like members are disposed in an opposing relationship to each other with a space provided therebetween such that mounting faces for said each LED apparatus are disposed on outer sides of the plate-like members, comprising:
    cooling fins being provided on the two plate-like members, said cooling fins extending in an opposing relationship to each other toward the space.

2. The LED lighting unit for a vehicle according to claim 1, wherein the cooling fins extend in a longitudinal direction which is perpendicular to a longitudinal direction of the two plate-like members.

3. The LED lighting unit for a vehicle according to claim 2, wherein the plate-like members and the reflectors are formed separately from each other.

4. The LED lighting unit for a vehicle according to claim 2, wherein one of the two plate-like members configures a high beam while the other of the two plate-like members configures a low beam.

5. The LED lighting unit for a vehicle according to claim 2, wherein erected portions having a face substantially perpendicular to the mounting faces of the LED apparatus are formed at one end portion of the plate-like members on the rear face side of the reflectors, and second cooling fins are provided on the erected portions.

6. The LED lighting unit for a vehicle according to claim 2, wherein the two plate-like members are spaced from and fixed to each other with a spacer interposed therebetween, and
    the cooling fins are disposed so as not to contact with any other member in the heightwise direction thereof.

7. The LED lighting unit for a vehicle according to claim 2, wherein the two plate-like members each have the same shape.

8. The LED lighting unit for a vehicle according to claim 2, wherein the cooling fins are formed to overlap with each other in a heightwise direction without contacting with each other when the two plate-like members are fixed.

9. The LED lighting unit for a vehicle according to claim 1, wherein the plate-like members and the reflectors are formed separately from each other.

10. The LED lighting unit for a vehicle according to claim 9, wherein one of the two plate-like members configures a high beam while the other of the two plate-like members configures a low beam.

11. The LED lighting unit for a vehicle according to claim 9, wherein erected portions having a face substantially perpendicular to the mounting faces of the LED apparatus are formed at one end portion of the plate-like members on the rear face side of the reflectors, and second cooling fins are provided on the erected portions.

12. The LED lighting unit for a vehicle according to claim 1, wherein one of the two plate-like members configures a high beam while the other of the two plate-like members configures a low beam.

13. The LED lighting unit for a vehicle according to claim 12, wherein erected portions having a face substantially perpendicular to the mounting faces of the LED apparatus are formed at one end portion of the plate-like members on the rear face side of the reflectors, and second cooling fins are provided on the erected portions.

14. The LED lighting unit for a vehicle according to claim 1, wherein erected portions having a face substantially perpendicular to the mounting faces of the LED apparatus are formed at one end portion of the plate-like members on the rear face side of the reflectors, and second cooling fins are provided on the erected portions.

15. The LED lighting unit for a vehicle according to claim 14, wherein the second cooling fins are formed on the opposite faces of the erected portions and on the rear face side of the reflectors, the second cooling fins are formed so as to extend to a position in proximity of the reflectors along a shape of the reflectors.

16. The LED lighting unit for a vehicle according to claim 1, wherein the two plate-like members are spaced from and fixed to each other with a spacer interposed therebetween, and
    the cooling fins are disposed so as not to contact with any other member in a heightwise direction thereof.

17. The LED lighting unit for a vehicle according to claim 1, wherein the two plate-like members each have the same shape.

18. The LED lighting unit for a vehicle according to claim 1, wherein the cooling fins are formed to overlap with each other in a heightwise direction without contacting with each other when the two plate-like members are fixed.

19. An LED lighting unit for a vehicle comprising:
    two plate-like members, each member having an LED apparatus for mounting as a light source;
    a reflector disposed for covering each said LED apparatus and configured to reflect light from the LED apparatus forwardly of the vehicle;
    said two plate-like members are disposed in an opposing relationship to each other with a space provided therebetween such that mounting faces for said each LED apparatus are disposed on outer sides of the plate-like members; and
    cooling fins being provided on the two plate-like members, said cooling fins extending in an opposing relationship to each other toward the space.

20. The LED lighting unit for a vehicle according to claim 19, wherein the cooling fins extend in a longitudinal direction which, is perpendicular to a longitudinal direction of the two plate-like members.

* * * * *